(12) United States Patent
Senshu

(10) Patent No.: US 7,751,287 B2
(45) Date of Patent: Jul. 6, 2010

(54) RECORDING MEDIUM, RECORDING METHOD, RECORDING APPARATUS, REPRODUCING METHOD, AND REPRODUCING APPARATUS

(75) Inventor: Susumu Senshu, Kanagawa (JP)

(73) Assignee: Sony Corporation, Tokyo (JP)

( * ) Notice: Subject to any disclaimer, the term of this patent is extended or adjusted under 35 U.S.C. 154(b) by 751 days.

(21) Appl. No.: 11/670,233

(22) Filed: Feb. 1, 2007

(65) Prior Publication Data

US 2007/0189136 A1    Aug. 16, 2007

(30) Foreign Application Priority Data

Feb. 14, 2006    (JP)    ............... 2006-035950

(51) Int. Cl.
    *G11B 7/00*    (2006.01)
(52) U.S. Cl. ............. 369/47.27; 369/59.25; 369/124.07
(58) Field of Classification Search ............. 369/59.11, 369/59.12, 47.27, 59.1, 275.3, 44.13, 47.1, 369/47.21, 47.28, 47.31, 59.25, 124.07
    See application file for complete search history.

(56) References Cited

U.S. PATENT DOCUMENTS 7,092,341 B2 *   8/2006   Kuribayashi et al. ..... 369/59.24

FOREIGN PATENT DOCUMENTS

| JP | 363087655 | * | 4/1988 | ............... 369/47.27 |
| JP | 2003-99953 | | 4/2003 | |
| JP | 2003-123249 | | 4/2003 | |
| JP | 2003-123267 | | 4/2003 | |
| JP | 2003-217132 | | 7/2003 | |
| JP | 2003-317236 | | 11/2003 | |

* cited by examiner

*Primary Examiner*—Nabil Z Hindi
(74) *Attorney, Agent, or Firm*—Oblon, Spivak, McClelland, Maier & Neustadt, L.L.P.

(57) ABSTRACT

A recording medium is disclosed. In the recording medium, address information is recorded in advance, one bit of the address information recorded is represented by a modulated wobble signal obtained by modulating each of a predetermined number of modulation unit sections of a wobble waveform, and a groove is formed in association with the modulated wobble signal, wherein, in converting the one bit of the address information into a chip sequence in which a predetermined number of chips continue, the modulated wobble signal is adapted such that a code sequence is inverted when the one bit is a first value and is not inverted when the one bit is a second value, and the modulated wobble signal is generated by modulating a wobble waveform in a modulation unit section according to a value of each of the chips of the chip sequence.

16 Claims, 12 Drawing Sheets

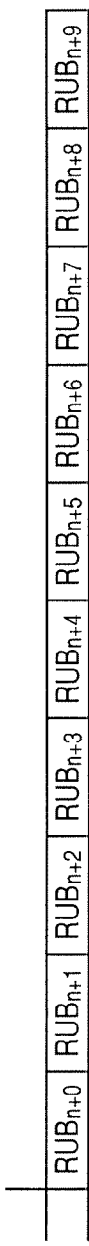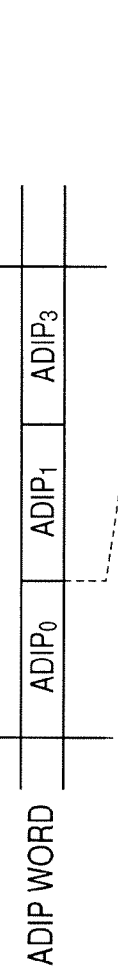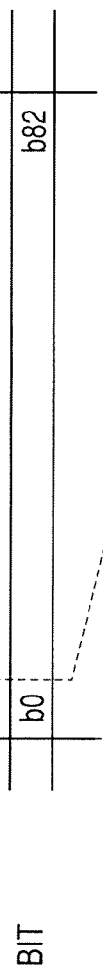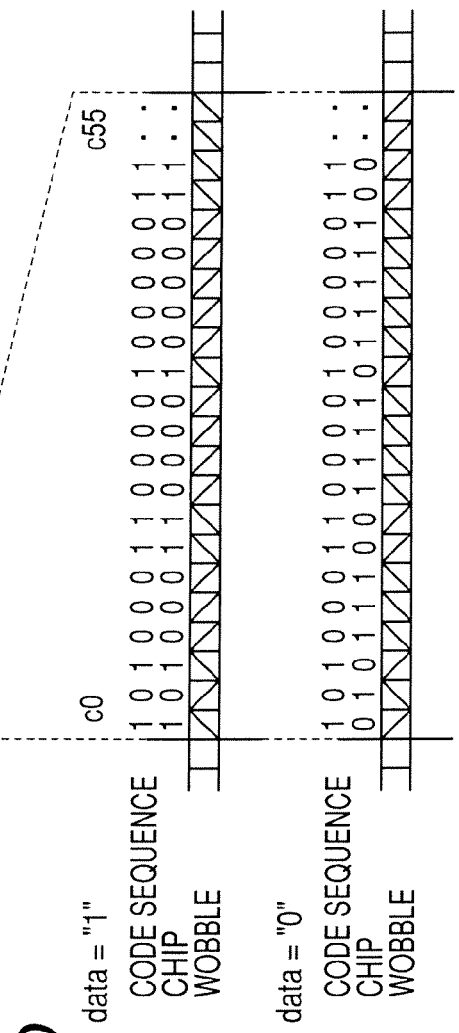
FIG. 2A  RUB
FIG. 2B  ADIP WORD
FIG. 2C  BIT
FIG. 2D

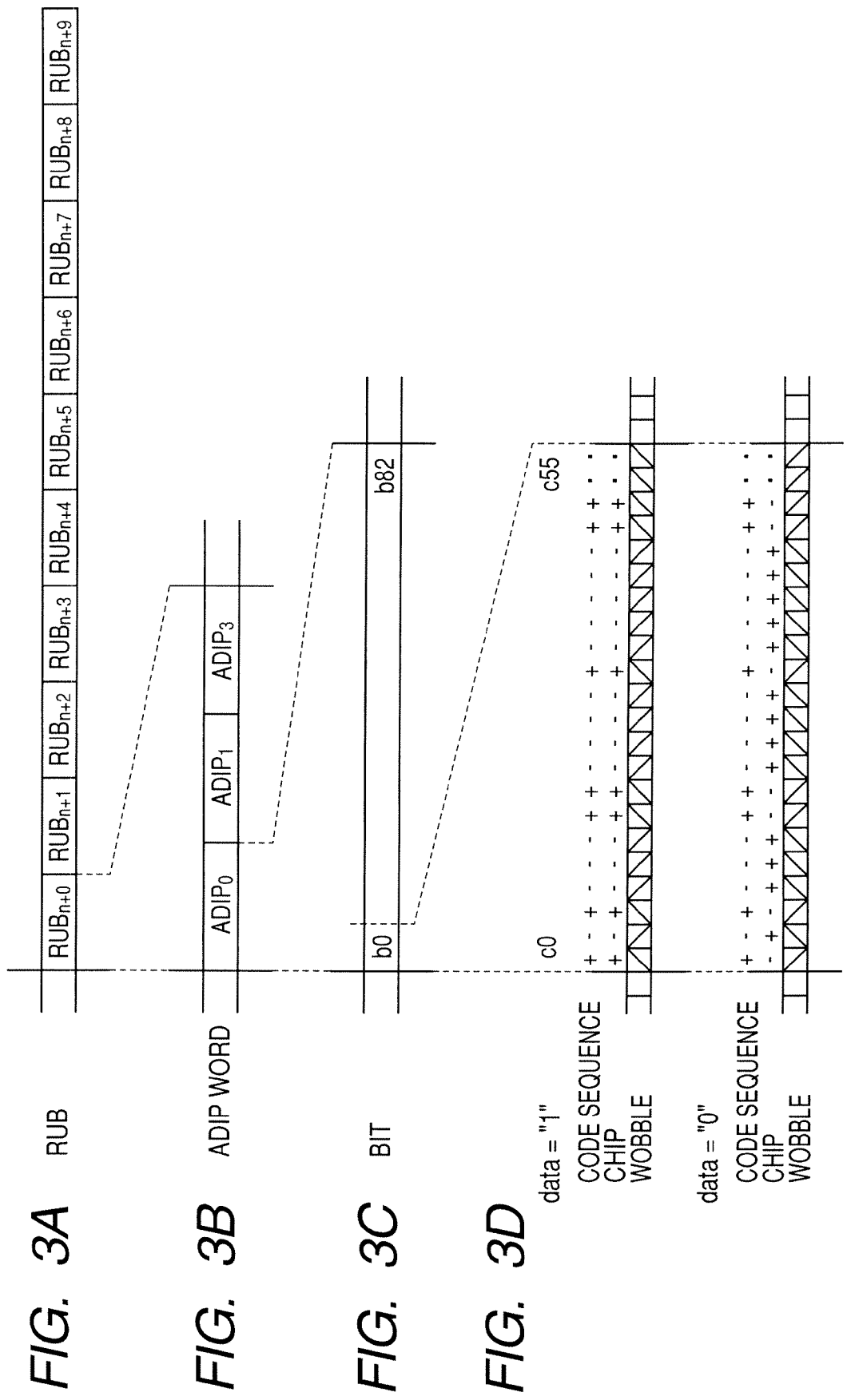

FIG. 10

| BIT ORDER IN WORD | BIT DATA |
|---|---|
| 0 | 0 |
| 1 | 1 (FIVE 1S CONTINUED) |
| 2 | 1 |
| 3 | 1 |
| 4 | 1 |
| 5 | 1 |
| 6 | 0 |
| 7 | 0 |
| 8 | ? (DATA 0) |
| 9 | ? (DATA 1) |
| 10 | ? (DATA 2) |
| 11 | ? (DATA 3) |
| 12 | 0 |
| 13 | ? (DATA 4) |
| 14 | ? (DATA 5) |
| 15 | ? (DATA 6) |
| 16 | ? (DATA 7) |
| 17 | 0 |
| ⋮ | ⋮ |
| 77 | 0 |
| 78 | ? (DATA 56) |
| 79 | ? (DATA 57) |
| 80 | ? (DATA 58) |
| 81 | ? (DATA 59) |
| 82 | 0 |

RECORDING MEDIUM, RECORDING METHOD, RECORDING APPARATUS, REPRODUCING METHOD, AND REPRODUCING APPARATUS

CROSS-REFERENCES TO RELATED APPLICATIONS

The present invention contains subject matter related to Japanese Patent Application JP 2006-035950 filed in the Japanese Patent Office on Feb. 14, 2006, the entire contents of which being incorporated herein by reference.

BACKGROUND OF THE INVENTION

1. Field of the Invention

The present invention relates to a recording medium, a recording method, a recording apparatus, a reproducing method, and a reproducing apparatus that are applicable to recording of address information in a recordable optical disk and reproduction of the address information.

2. Description of the Related Art

Various formats have been proposed for optical disks. As recordable optical disks, there are a write-once optical disk in which it is possible to record data only once and a rewritable optical disk in which it is possible to rewrite data. In both the kinds of optical disks, addresses indicating positions in a recordable track provided on the disk need to be recorded in advance. As a method of recording the addresses and clock information, a method of forming a wobble groove on a disk has been proposed.

In an address format (see JP-A-2003-123249 and JP-A-2003-123267) adopted in a latest rewritable high-density optical disk (Blu-ray Disc (registered trademark), both MSK and STW (Saw Tooth Wobble or HMW grooves, i.e., High Frequency Modulated grooves) are used.

As shown in FIG. 13, a group of fifty-six wobbles in total is set as an ADIP unit. One bit of "0" or "1" synchronization information, a reference unit, or a monotone unit is represented by this ADIP unit. Eight kinds of ADIP Units (a monotone unit, a reference unit, four kinds of synchronization units, and two kinds of data units representing data "0" and "1", respectively) are shown in FIG. 13. Eighty-three continuous ADIP Units form an ADIP word indicating one address. The ADIP word includes address information having a 24-bit length, auxiliary data having a 12-bit length, a reference area, and data for error correction. Three ADIP words are allocated to one RUB (Recording Unit Block) (in a unit of 64 kilobytes), which is a unit for recording main data.

As shown in FIG. 13, wobble numbers 0 to 55 are added to the ADIP units including fifty-six wobbles to distinguish the ADIP units. For example, sections from the wobble numbers 0 to 2 are modulated by the MSK and sections from the wobble numbers 18 to 54 of the reference unit and the data unit are modulated by the STW. The monotone wobbles not modulated by the MSK and the STW are a waveform ($\cos(2\pi ft)$) of a predetermined frequency.

The STW system is a system for generating a modulation waveform similar to the teeth of a saw by adding a second harmonic ($\sin(2\pi 2 ft)$) to a basic wave ($\cos(2\pi ft)$) or subtracting the second harmonic ($\sin(2\pi 2 ft)$) from the basic wave ($\cos(2\pi ft)$). An amplitude of the second harmonic is set to be as small as about ¼ of the basic waveform. Since one of the addition and the subtraction is selected according to "0" or "1", the modulation waveform is varied. Data is repeatedly recorded in the sections of the wobble numbers 18 to 54 of the reference unit and the data unit.

The two kinds of systems are used as described above in order to make it possible to compensate for disadvantages of the respective systems. In the MSK system, one bit is recorded by modulating first three wobbles of an ADIP unit. Thus, it is possible to use the wobbles as a reference for determining a position of data at the time of reproduction. On the other hand, in the STW system, data is repeatedly recorded over a wide range as a very small waveform change. At the time of reproduction, a reproduced signal is integrated to discriminate "0" or "1". Therefore, it is difficult to use the reproduced signal as information for detecting delimiters of data. However, the MSK system, which is a local recording system, is easily affected by a defect due to scratches, dust, and the like on a disk. The STW system has an advantage that the system is less easily affected by such a defect because data is recorded over a longer period.

SUMMARY OF THE INVENTION

However, when the two systems are used, a size of hardware of a signal processing system for forming a wobble groove at the time of manufacturing of a disk and a signal processing system for reading an address in a recording/reproducing apparatus increases. If possible, it is desired to use only one system.

Therefore, it is desirable to provide a recording medium, a recording method, a recording apparatus, a reproducing method, and a reproducing apparatus that adopt a defect-resistant system for applying very small wobble modulation over a relatively wide area such as the STW system and can solve the difficulty in synchronization.

According to an embodiment of the invention, there is provided a recording medium in which address information is recorded in advance, one bit of the address information recorded is represented by a modulated wobble signal obtained by modulating each of a predetermined number of modulation unit sections of a wobble waveform, and a groove is formed in association with the modulated wobble signal. In the recording medium, the modulated wobble signal is adapted such that, in converting the one bit of the address information into a chip sequence in which a predetermined number of chips continue, a code sequence is inverted when the one bit is a first value and is not inverted when the one bit is a second value. The modulated wobble signal is generated by modulating a wobble waveform in a modulation unit section according to a value of each of the chips of the chip sequence.

According to another embodiment of the invention, there is provided a recording method of recording a modulated wobble signal obtained by modulating each of a predetermined number of modulation unit sections of a wobble waveform on the recording medium, the modulated wobble signal representing one bit of address information. In converting the one bit of the address information into a chip sequence in which a predetermined number of chips continue, a code sequence is inverted when the one bit is a first value and is not inverted when the one bit is a second value. The modulated wobble signal is generated by modulating a wobble waveform in a modulation unit section according to a value of each of the chips of the chip sequence.

According to still another embodiment of the invention, there is provided a recording apparatus that records a modulated wobble signal obtained by modulating each of a predetermined number of modulation unit sections of a wobble waveform on the recording medium, the modulated wobble signal representing one bit of address information. The recording apparatus includes: arithmetic operation means for converting the one bit of the address information into a chip sequence, in which a predetermined number of chips continue, to invert a code sequence when the one bit is a first value and not to invert the code sequence when the one bit is a second value; and wobble-waveform generating means for generating the modulated wobble signal by modulating a wobble waveform in a modulation unit section according to a value of each of the chips of the chip sequence.

According to still another embodiment of the invention, there is provided a reproducing method of converting one bit of address information into a chip sequence, in which a predetermined number of chips continue, to invert a code sequence when the one bit of the address information is a first value and not to invert the code sequence when the one bit of the address information is a second value, modulating a wobble waveform in a modulation unit section according to a value of each of the chips of the chip sequence, and reproducing a recording medium in which the one bit of the address information is recorded in a predetermined number of modulation unit sections of a modulated wobble signal. The reproducing method includes the steps of: reproducing the modulated wobble signal from the recording medium; generating the chip sequence from the modulated wobble signal reproduced; subjecting the chip sequence and the code sequence to an arithmetic operation and discriminating delimiters of the predetermined number of modulation unit sections representing the one bit of the address information and the one bit of the address information on the basis of a result of the arithmetic operation; and initializing timing generation according to the delimiters of the modulation unit sections.

According to still another embodiment of the invention, there is provided a reproducing apparatus that converts one bit of address information into a chip sequence, in which a predetermined number of chips continue, to invert a code sequence when the one bit of the address information is a first value and not to invert the code sequence when the one bit of the address information is a second value, modulates a wobble waveform in a modulation unit section according to a value of each of the chips of the chip sequence, and reproduces a recording medium in which the one bit of the address information is recorded in a predetermined number of modulation unit sections of a modulated wobble signal. The reproducing apparatus includes: reproducing means for reproducing the modulated wobble signal from the recording medium; chip-sequence generating means for generating the chip sequence from the modulated wobble signal reproduced; arithmetic operation means for subjecting the chip sequence and the code sequence to an arithmetic operation and discriminating delimiters of the predetermined number of modulation unit sections representing the one bit of the address information and the one bit of the address information on the basis of a result of the arithmetic operation; and timing generating means initialized according to the delimiters of the modulation unit sections.

According to the embodiments of the invention, since the one bit of the address information is represented by the modulated wobble signal including the predetermined number of modulation unit sections, it is possible to prevent the one bit of the address information from being easily affected by noise, a defect, and the like. Since the one bit of the address information is converted according to the code sequence at the time of recording, it is possible to detect timing synchronizing with data by discriminating the delimiters of the predetermined number of modulation unit sections according to the arithmetic operation of the chip sequence reproduced and the code sequence.

BRIEF DESCRIPTION OF THE DRAWINGS

In the accompanying drawings:

FIGS. 2A to 2D are schematic diagrams showing examples of data, address information, a bit sequence, a code sequence, a chip sequence, and a modulated wobble signal according to the embodiment;

FIGS. 3A to 3D are schematic diagrams showing, in another representation method, the examples of data, address information, a bit sequence, a code sequence, a chip sequence, and a modulated wobble signal according to the embodiment;

FIG. 10 is a schematic diagram for explaining synchronization detection according to the embodiment;

DESCRIPTION OF THE PREFERRED EMBODIMENTS

Figure 1:
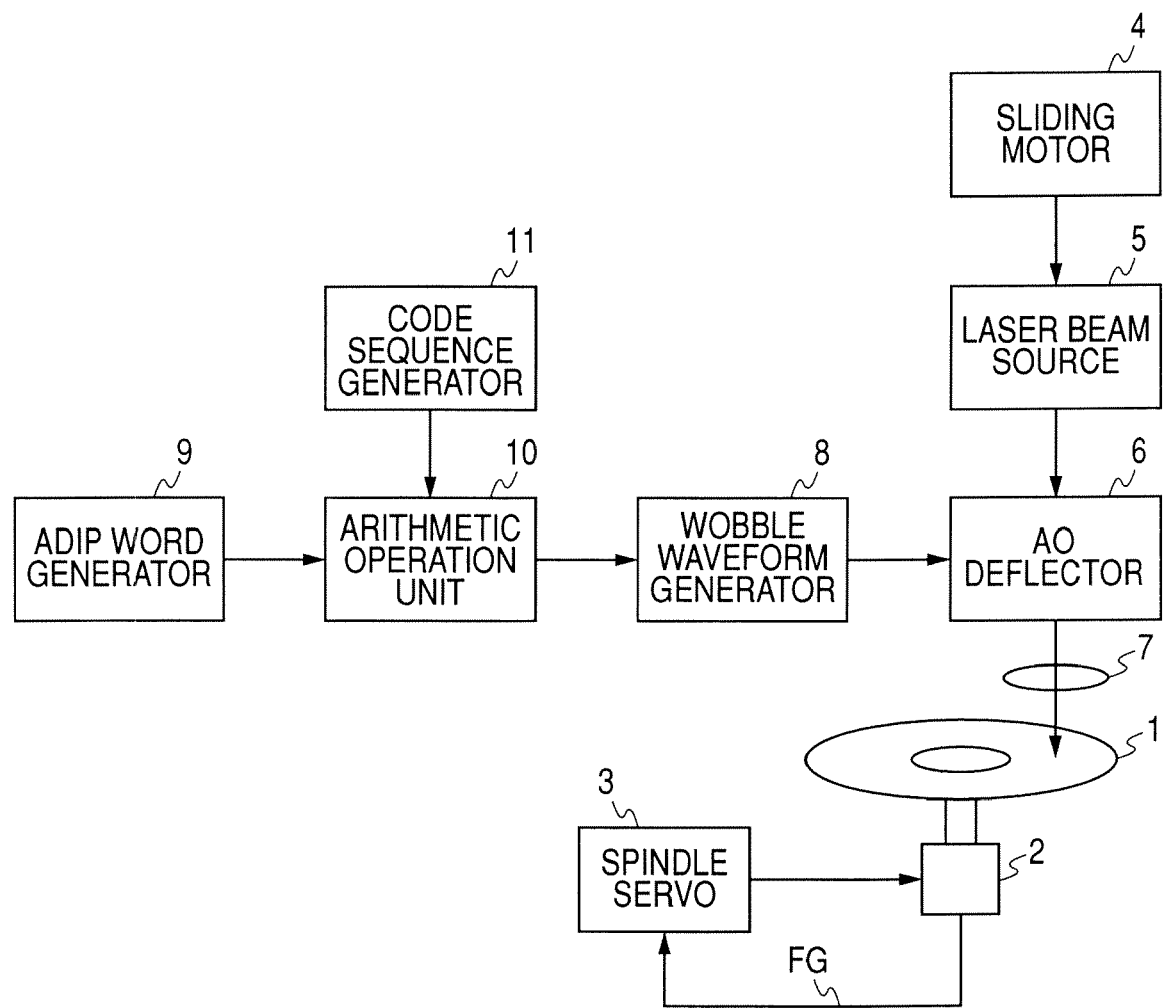
FIG. 1 is a block diagram showing an example of a structure of a recording apparatus according to an embodiment of the invention.

An embodiment of the invention will be hereinafter explained with reference to the accompanying drawings. FIG. 1 is a diagram showing a structure of a wobbling-groove forming apparatus. In the case of a recordable disk, a wobbling groove having address information needs to be formed in advance. Thus, the wobbling groove is recorded in the disk by a cutting apparatus for manufacturing a disk master.

In FIG. 1, reference numeral 1 denotes a master having a resist layer formed on a glass master. The master 1 is placed on a turntable (not shown) and rotated at constant linear velocity by a spindle motor 2. The spindle motor 2 is controlled by a spindle servo 3. The master 1 or an optical pickup that irradiates a recording laser beam is slid in a radial direction of the master 1 by a sliding motor 4. Exposure in a desired pattern is applied to the master 1. It is possible to form a latent image of a groove pattern of a data recording area on the master 1 (the resist layer) at a predetermined track pitch according to the exposure.

The recording laser beam is generated by a laser beam source 5. It is possible to use an arbitrary light source as the laser beam source 5. However, it is preferable to use, for example, a far ultraviolet laser having a waveform length of between 200 nm and 300 nm, a so-called DeepUV. The laser beam emitted from the laser beam source 5 is made incident on an AO (Acoustic Optical) deflector 6. The AO deflector 6 changes a traveling direction of a laser beam according to an acoustooptic effect. A deflection angle of the AO deflector 6 increases in proportion to a frequency of a high-frequency driving signal supplied to an acoustooptic element. The laser beam deflected by the AO deflector 6 is irradiated on the disk master 1 via an object lens 7.

A modulation signal to the AO deflector 6 is generated by a wobble waveform generator 8. Bit information from an ADIP word generator 9 is supplied to an arithmetic operation unit 10. A code sequence from a code sequence generator 11 and the bit information are subjected to an arithmetic operation. The arithmetic operation unit 10 performs, for example, an arithmetic operation of exclusive NOR. Output data of the arithmetic operation unit 10 is supplied to the wobble waveform generator 8. A wobble waveform is outputted from the wobble waveform generator 8. The wobble waveform is supplied to the AO deflector 6. In the AO deflector 6, a not-shown high-frequency carrier wave is FM-modulated according to the wobble waveform and a high-frequency driving signal is formed. The high-frequency driving signal is supplied to the acoustooptic element. The laser beam deflected by the AO deflector 6 is irradiated on the master 1 via the object lens 7 and a latent image corresponding to the wobbling groove is formed thereon.

Subsequently, development processing is applied to the resist layer on the master 1. As an example, the resist layer applied to the master 1 is a positive resist. A portion of the resist layer on which a latent image is formed by resist light is melted by development. As a result, it is possible to obtain a master having a groove patterned thereon.

Metal such as nickel is precipitated on the master by plating, peeled off, and trimmed to obtain a stamper. The stamper is disposed in a cavity of an injection molding device. A disk substrate is manufactured through injection of resin into the cavity. After the disk substrate injection-molded is cooled, a metal thin film of an aluminum alloy, silver, or the like is formed on a pit surface side using a sputtering device to form a reflective layer.

Ultraviolet curing resin is dropped as an adhesive on the disk substrate having the reflective layer formed thereon and uniformly applied to the disk substrate according to a spin coat method. Thereafter, an ultraviolet-curing-resin applied surface on the disk substrate and a polycarbonate film for forming cover layer (thickness: 0.1 mm) are held in opposed positions and then stuck together. The ultraviolet-curing-resin applied surface and the polycarbonate film are stuck together in a vacuum. This is for the purpose of preventing a wrinkle or a gap from being formed on stuck surfaces of the disk substrate and the polycarbonate film to cause reading error.

An ultraviolet ray is irradiated on the disk having the polycarbonate film stuck thereon to cure the ultraviolet curing resin and bond the disk substrate and the polycarbonate film. Moreover, a hard coat agent of an ultraviolet curing type is dropped on the polycarbonate film stuck to the disk and uniformly applied thereto according to the spin coat method. Then, the ultraviolet ray is irradiated on the disk again to cure the hard coat agent to manufacture a hard coat layer. Consequently, a recordable optical disk is completed.

FIGS. 2A to 2D are diagrams showing a data structure of address information according to this embodiment. FIG. 2A is a diagram showing a sequence of RUBs ($RUB_{n+0}$, $RUB_{n+1}$, $RUB_{n+2}$, $RUB_{n+3}$, ... ) of recording data. A RUB is a unit for recording main data (recording and reproduction data). The RUM is set to predetermined length, for example, 64 kilobytes. As shown in FIG. 2B, three ADIP words ($ADIP_0$, $ADIP_1$, and $ADIP_2$) are recorded for one RUB.

As shown in FIG. 2C, one ADIP word includes 83 bits (b0 to b82). The one ADIP word includes, for example, one piece of address information, one piece of auxiliary data, a reference area, and a parity of an error correction code. These kinds of information are represented by using, for example, 60 bits in the 83 bits. As shown in FIG. 2D, each bit of the 83 bits is represented by a chip sequence in which a predetermined number of chips, for example, 56 chips continue. One chip corresponds to one modulation unit section of the wobble waveform (hereinafter referred to as one wobble or one wobble period as appropriate). One bit ("0" or "1") of the address information is represented by a modulated wobble signal obtained by modulating fifty-six wobbles. One wobble is, for example, one period of a basic wobble waveform ($\cos(2\pi \text{ ft})$). Therefore, one ADIP word includes (83×56) wobbles.

The ADIP word generator 9 generates a chip sequence in which all the fifty-six wobbles are "0" and "1" in association with data "0" and "1", respectively, in the same manner as the STW system in the past. In this embodiment, in the arithmetic operation unit 10, an arithmetic operation (exclusive NOR) of a pseudo-random sequence, for example, an M sequence (Maximum-length linear shift-register sequence) and the chip sequence is performed by the code sequence generator 11. A result of the arithmetic operation is set as fifty-six chips. A wobble waveform including fifty-six wobbles corresponding to the fifty-six chips is generated by the wobble waveform generator 8. The wobble waveform generated is recorded.

In the example shown in FIG. 2D, examples of a chip sequence and a modulated wobble signal obtained by using an M sequence of (101000110000100000011 . . . ) are shown. Even if a code sequence is identical, in the case of a sequence in which one bit of data is "1" and all fifty-six bits are "1", a chip sequence identical with the code sequence is generated and, in the case of a sequence in which one bit of data is "0" and all fifty-six bits are "0", a chip sequence inverted from the code sequence is generated.

A slanted line added to each of frames of the modulated wobble signal, i.e., each of wobbles indicates that the wobble is modulated by "1" or "0" in the STW system. A slanted line up to the right is added in association with "1" of a chip and a slanted line down to the right is added in association with "0" of a chip. As a waveform of an actual modulated wobble signal, as described later, a basic waveform is modulated to a waveform similar to a saw tooth wave. In the case of "1" of a bit, a waveform is gentle in rising (an outward direction of the disk in a radial direction of the disk) with respect to a time direction and steep in falling (an inward direction of the disk in the radial direction of the disk) with respect to the time direction. In the case of "0" of a bit, a waveform is steep in rising (the outward direction of the disk) with respect to the time direction and gentle in falling (the inward direction of the disk) with respect to the time direction. As shown in FIG. 3D, as a method of representing each of chips, it is also possible to use − (or −1) and + (or +1) other than "0" and "1".

Figure 4:
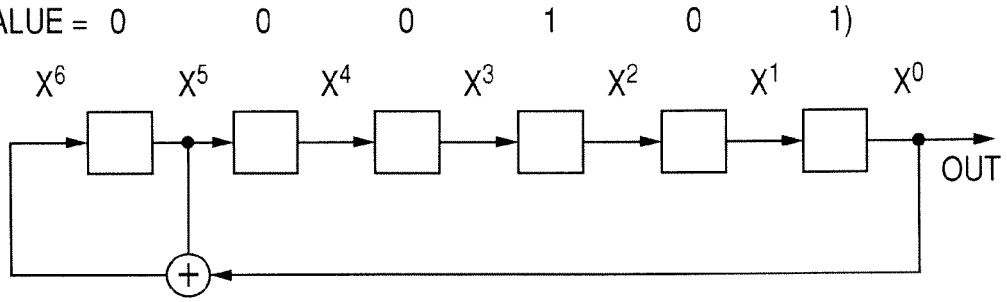
FIG. 4 is a block diagram showing an example of a code sequence generator according to the embodiment.

FIG. 4 is a diagram showing an example of a structure of the code sequence generator 11 that generates the M sequence. As a generating polynomial, ($x^6 = x^5 + x^0$) is used. In a shift register including six stages of registers, an output fed back from an inter-stage corresponding to $x^0$ and $x^5$ with respect to exclusive OR is supplied. The output is supplied to an input side of the shift register.

In the structure in FIG. 4, a sequence having $2^6 - 1 = 63$ as a period is generated. However, by setting an initial value in the shift register for each of periods of 56, a code sequence having a number (56) equal to the number of chips for representing one bit as a period is formed. By using the pseudo-random sequence and appropriately selecting an initial value, it is possible to place "1" and "0" in substantially the same number in one period. As the pseudo-random sequence, a GOLD sequence and the like may be used other than the M sequence.

Figure 5A:
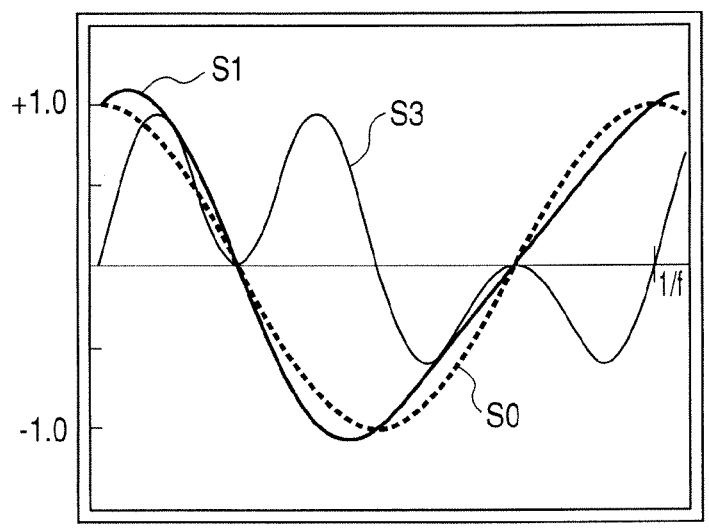
FIGS. 5A and 5B are waveform charts showing an example of a basic wobble waveform, a modulated wobble signal, and an integral value in a wobble period according to the embodiment.

The modulated wobble signal will be explained more in detail with reference to FIGS. 5A and 5B and FIGS. 6A and 6B. In FIGS. 5A and 5B and FIGS. 6A and 6B, the abscissa indicates a time axis, one period (i.e., one chip=one wobble) of the basic wobble waveform is shown, and the ordinate indicates a normalized amplitude. FIG. 5A is a waveform chart showing a waveform in the case in which a chip c(n) is "1". FIG. 6A is a waveform chart showing a waveform in the case in which the chip c(n) is "0".

In FIGS. 5A and 6A, a waveform indicated by a broken line is a basic wobble waveform SO (=cos(2π ft). In the case of c(n)="1", a modulated waveform S1 is formed by adding sin of a frequency twice as high as that of the basic wobble waveform SO to the basic wobble waveform SO. In other words, S1=A cos(2π ft)+a sin(2π2ft). A and "a" are in a relation of A>a and are set as, for example, A=1 and a=0.2. This modulated wobble waveform S1 is a waveform modulated to be gentle compared with the basic wobble waveform SO in rising (the outward direction of the disk in the radial direction of the disk) with respect to the time direction and steep compared with the basic wobble waveform SO in falling (in the inward direction of the disk in the radial direction of the disk) with respect to the time direction as described above.

As shown in FIG. 6A, in the case of c(n)="0", a modulated waveform S2 is formed by subtracting sin of a frequency twice as high as that of the basic wobble waveform SO from the basic wobble waveform SO. In other words, S2=A cos(2π ft)−a sin(2π2ft). This modulate wobble waveform S2 is a waveform modulated to be steep compared with the basic wobble waveform SO in rising (the outward direction of the disk) with respect to the time direction and gentle compared with the basic wobble waveform SO in falling (the inward direction of the disk) with respect to the time direction as described above. Both the modulated wobble waveforms S1 and S2 have a phase identical with that of the basic wobble waveform at a zero cross point to make it possible to easily extract a clock on a reproduction side.

In FIGS. 5A and 6A, each of waveforms S3 and S4 indicates a waveform obtained by multiplying a reproduced modulated wobble signal by a sin signal (sin(2π2ft)) having a frequency used in processing on a reproduction side twice as high as that of a basic wave. In other words, the waveform S3 is obtained from a reproduced modulated wobble waveform S1×sin(2π2ft) and a waveform S4 is obtained from a reproduced modulated wobble waveform S2×sin(2π ft).

Figure 5B:
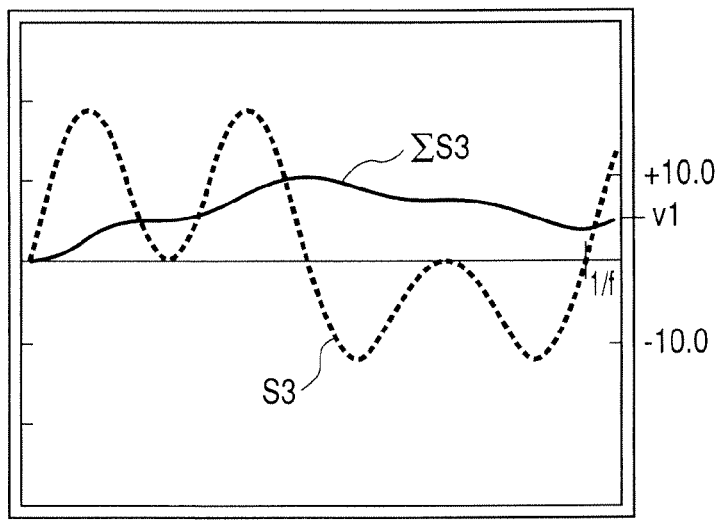
Figure 6A:
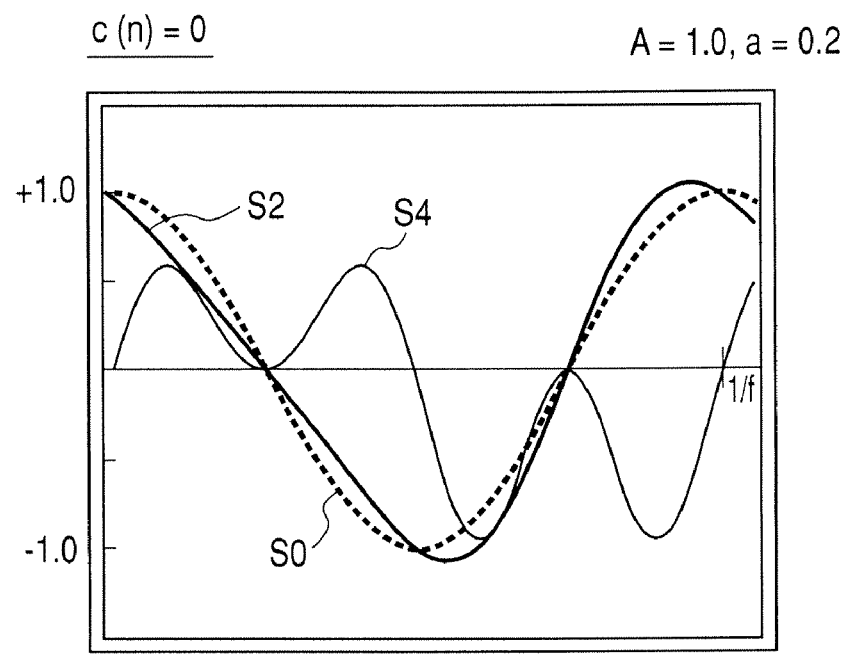
FIGS. 6A and 6B are a waveform charts showing another example of a basic wobble waveform, a modulated wobble signal, an integral value in a wobble period according to the embodiment.
Figure 6B:
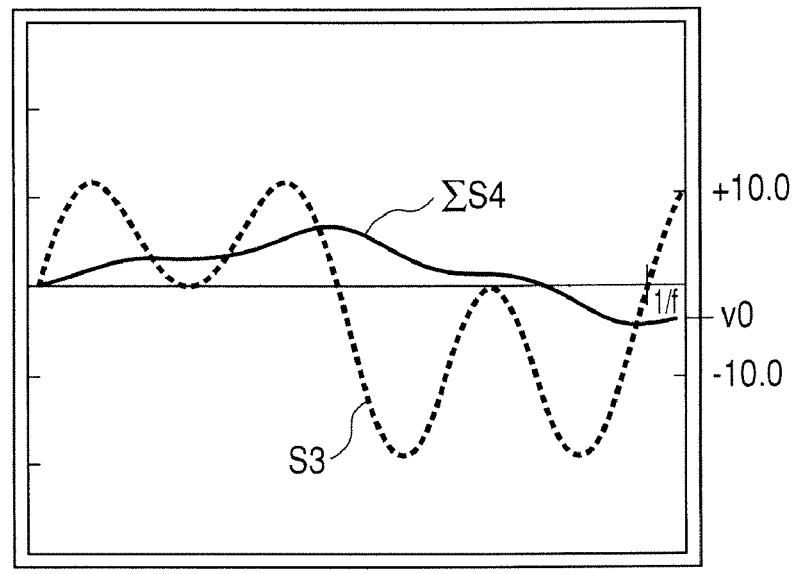

On the reproduction side, as shown in FIGS. 5B and 6B, respectively, integral values ΣS3 and ΣS4 are obtained by integrating the waveforms S3 and S4 over one wobble period. The integral value ΣS3 at a point when one wobble period has passed is a positive value v1. On the other hand, the integral value ΣS4 at the point when one wobble period has passed is a negative value v0. The integral values are treated as, for example, v1=+1 and v0=−1.

Since one bit of data is represented by fifty-six wobbles (chips), if all the wobbles are +1, +56 is obtained as an integration result of the fifty-six wobbles. If all the wobbles are −1, −56 is obtained as an integration result of the fifty-six wobbles. As described later, a reproduced chip sequence obtained as an integral value of each of the wobbles is multiplied by a code sequence identical with the code sequence used at the time of recording. One bit ("1"/"0") of data is discriminated on the basis of a result obtained by integrating a result of the multiplication by the fifty-six wobbles. In this embodiment, integration in one wobble period and integration in a predetermined number (here, fifty-six) of wobbles (hereinafter referred to as a bit period as appropriate) for representing data of one bit are performed. One ADIP word is represented by 83 bits and an ADIP of one RUB is represented by three ADIP words.

Figure 7:
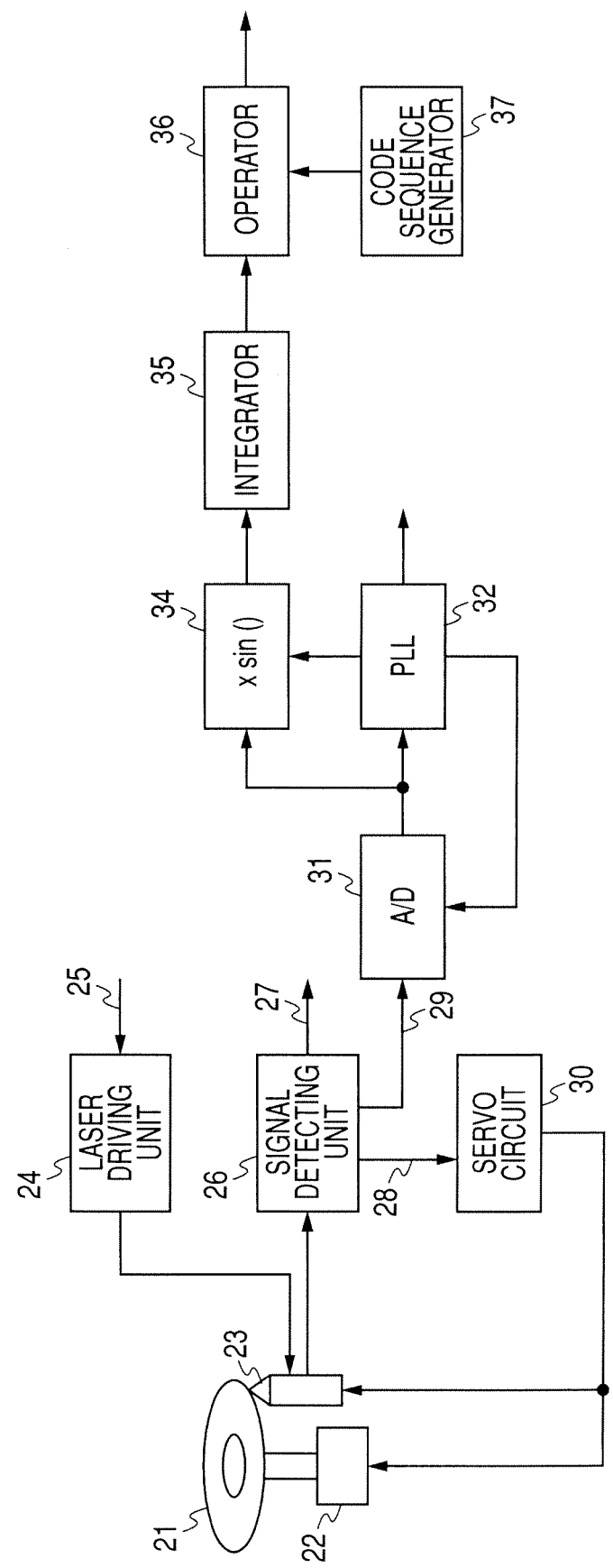
FIG. 7 is a block diagram showing an example of a structure of a reproducing apparatus according to the embodiment.

FIG. 7 is a block diagram showing a schematic structure of a disk recording/reproducing apparatus that records data in an optical disk 21 having a pre-groove in which an ADIP is recorded according to the STW system as described above and reproduces the data from the optical disk 21. In FIG. 7, components for reproduction of address information related to the invention are mainly shown.

The optical disk 21 is rotated at constant linear velocity by a spindle motor 22. A driving signal from a laser driving unit 24 is supplied to an optical head 23. A laser beam with intensity modulated according to recording data 25 is irradiated on the optical disk 21 from the optical head 23. Data is recorded in a predetermined position of the optical disk 21 determined on the basis of address information reproduced.

A reading laser beam from the optical head 23 is irradiated on the optical disk 21. Reflected light of the laser beam is detected by a photodetector in the optical head 23. A reproduced signal is detected by a signal detecting unit 26. A reproduced signal 27, a servo-error signal 28 such as a focus error signal or a tracking error signal, and a modulated wobble signal 29 are extracted from the signal detecting unit 26.

The servo-error signal 28 is supplied to a servo circuit 30. Rotation of the spindle motor 22 is controlled by the servo circuit 30. Focus and tracking of the optical head 23 are also controlled by the servo circuit 30.

The modulated wobble signal 29 detected by the signal detecting unit 26 is supplied to an A/D converter 31 and converted into a digital signal by the A/D converter 31. An output signal of the A/D converter 31 is supplied to a PLL (Phase Locked Loop) 32 and an operator 34. A clock and a wobble edge signal synchronizing with the reproduced signal are outputted from the PLL 32. The clock and the wobble edge signal are supplied to a timing generator (not shown) described later.

The clock is supplied to the PLL 32 from the operator 34. The operator 34 multiplies, as described above, the reproduced modulated wobble signal by the sin signal (sin(2π2ft)) of a frequency twice as high as that of the basic wave. In other words, S3=S1×sin(2π2ft) or S4=S2×sin(2π2ft) is obtained. An output signal of the operator 34 is supplied to an integrator 35. The integrator 35 performs integration in one wobble period. A result of the integration in one wobble period is +1 or −1. However, actually, because of an influence of noise, a defect, or the like, it may be impossible to determine which value the result takes. Thus, a value of 0 indicating "undefined" may be used to indicate the result with three values.

An output of the operator 35 is supplied to an operator 36. A pseudo-random sequence, for example, an M sequence identical with that used on the recording side is supplied to the operator 36 from a code sequence generator 37. The operator 36 calculates exclusive NOR of a result of integration of each of wobble periods by the integrator 35 and each of bits of the M sequence. The operator 36 further integrates a result of the calculation over a bit period of fifty-six chips and judges whether one bit of data (b0 to b82) is "1" or "0" on the basis of a result of the integration. Each of the bits is finally outputted from the operator 36. When it is difficult to determine an output of the judgment of one bit as any one of the values, a value of "unidentified" may be outputted.

Figure 8:
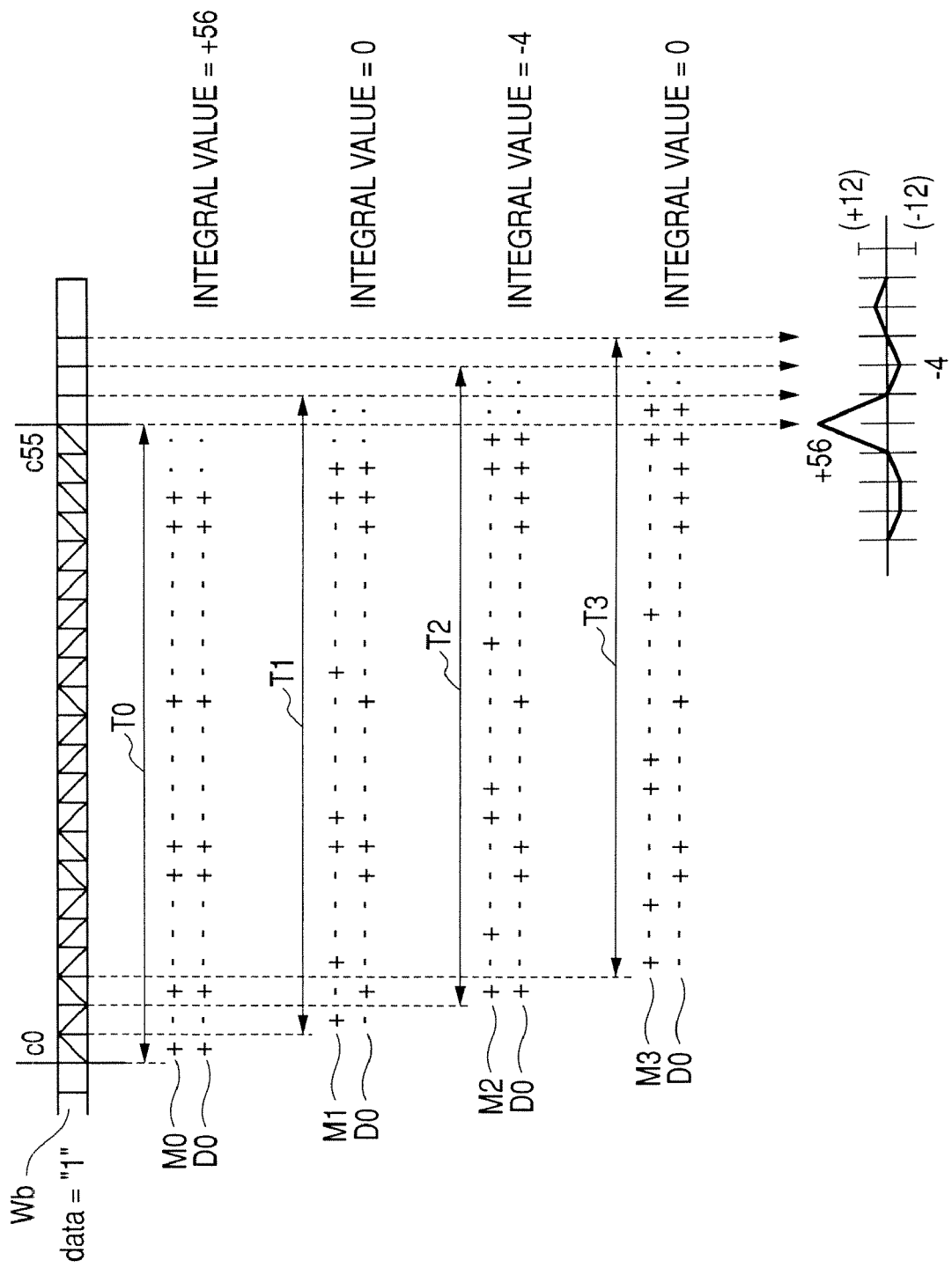
FIG. 8 is a schematic diagram for explaining processing in the reproducing apparatus according to the embodiment.

FIG. 8 is a schematic diagram for explaining processing in the operator 36 on the reproduction side. In FIG. 8, Wb indicates a modulated wobble signal reproduced. A reproduced chip sequence D0, which is a sequence of a result of integration in one wobble period, is obtained from the integrator 35 in association with the modulated wobble signal. The operator 36 subjects the reproduced chip sequence D0 and an M sequence M0 from the code sequence generator 37 to an arithmetic operation. A result of the arithmetic operation is integrated for a period of a bit period. Peaks and bit data indicating delimiters of fifty-six chips are obtained. In FIG. 8, a relative phase relation between the fifty-six wobbles and the M sequence is represented by shifting the M sequence by one wobble at a time. In other words, M1 is obtained by shifting a phase of the M sequence M0 to the right by one wobble and M2 and M3 are obtained by shifting the phase to the right by one wobble, respectively.

All outputs of the operator 36 obtained as a result of the arithmetic operation of the reproduced chip sequence D0 and the M sequence M0 corresponding to a correct delimiter T0 (c0 to c55) of the fifty-six chips of the modulated wobble signal are + (=1). Therefore, in this case, an integral value of one bit period is +56. It is possible to represent this delimiter T0 as a phase difference 0 between the wobble waveform and the M sequence.

When D0 and M1 are subjected to an arithmetic operation in a delimiter T1 shifted by one wobble with respect the delimiter T0 (i.e., a phase difference is 1), in the fifty-six chips, the number of + and the number of − (=−1) are the same and an integral value of one bit period is 0. When D0 and M2 are subjected to an arithmetic operation in a delimiter T2 shifted by two wobbles with respect to the delimiter T0 (i.e., a phase difference is 2), an integral value of one bit period is −4. When D0 and M3 are subjected to an arithmetic operation in a delimiter T3 shifted by three wobbles with respect to the delimiter T0 (i.e., a phase difference is 3), the number of + and the number of − (=−1) are the same in the fifty-six chips and an integral value of one bit period is 0.

A phase difference is plotted on the abscissa and an integral value of one bit period is plotted on the ordinate in association with the relative phase relation between the modulated wobble signal reproduced and the M sequence in this way. In this case, when one bit of data includes fifty-six chips= fifty-six wobbles of the period 63 (chips) of the M sequence, a peak of +56 with a phase difference 0 is obtained. When a positive peak value of this integral value is obtained, it is judged that the one bit of the data is "1". Actually, since noise due to a defect or the like of the disk is included in the reproduced signal, an appropriate threshold is set and, when an integral value exceeding the threshold is obtained, a value of the one bit of the data is determined.

As an example, when the integral value is a positive value larger than +12 (a positive threshold), the one bit of the data is judged as "1". When the bit is "0" unlike the example described above, an integral value is −56 if there is no influence of noise. When the integral value is a negative value smaller than −12 (a negative threshold), the one bit of the data is judged as "0". In this way, a value of each of bits of the data is determined from the reproduced modulated wobble signal.

The example shown in FIG. 8 represents a result of integration in one wobble period with 1 or 0, i.e., one bit. However, a result of integration may be represented by two or more bits. In this case, naturally, an absolute value of a value of a result of integration of one bit period is a large value compared with that in the example in FIG. 8.

Figure 9:
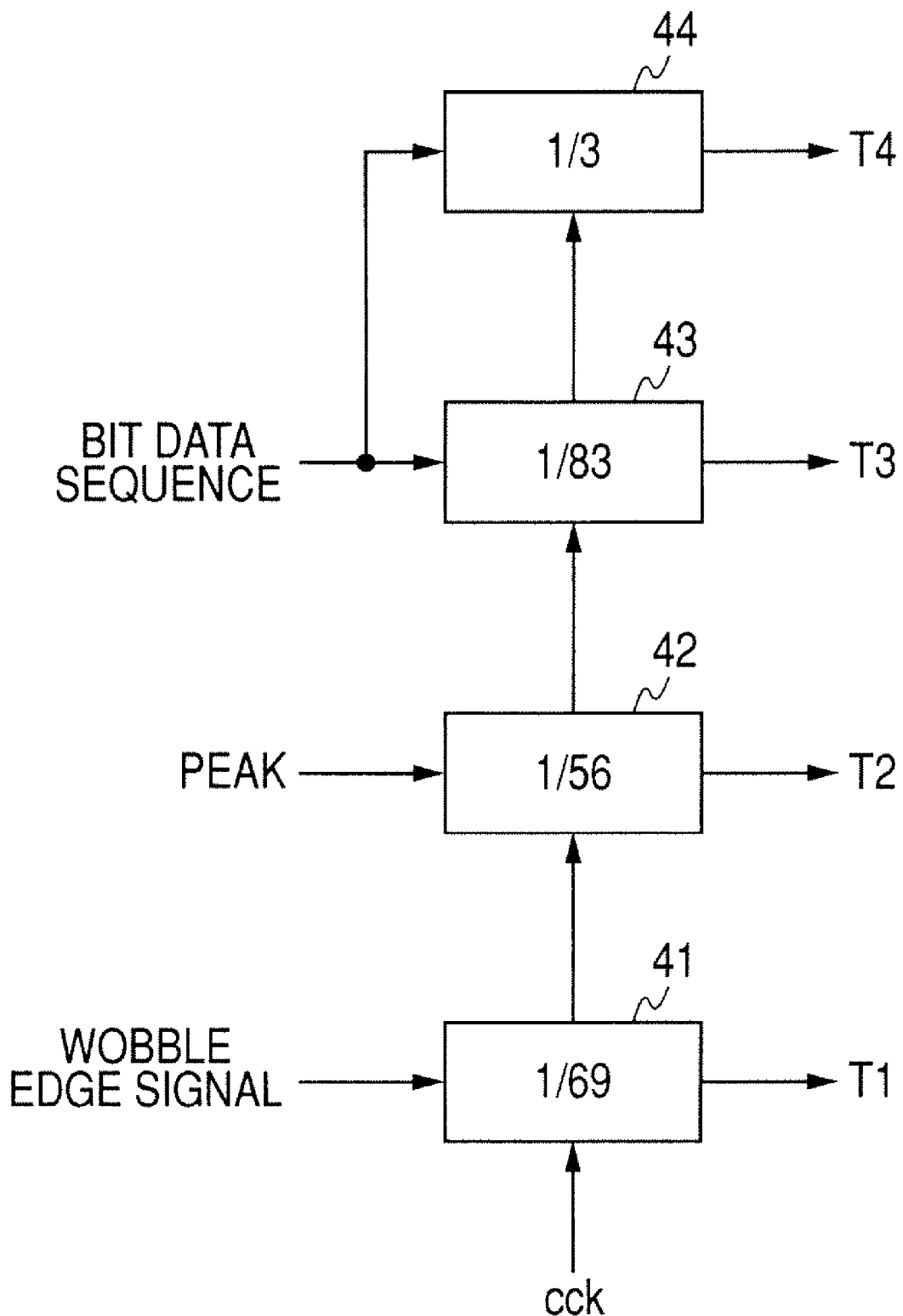
FIG. 9 is a block diagram showing an example of a structure of a timing generator according to the embodiment.

FIG. 9 is a block diagram showing a structure of an example of a timing generator according to this embodiment. The timing generator generates a timing signal necessary for the processing on the reproduction side shown in FIG. 7. The timing generator includes a 69-ary counter 41, a 56-ary counter 42, an 83-ary counter 43, and a ternary counter 44. Cck indicates a clock signal generated by the PLL 32.

The 69-ary counter 41 defines timing in one wobble period by counting the clock signal cck. When a wobble edge signal is determined, initialization for loading a predetermined value is performed. The 69-ary counter 41 generates various timing signals T1 in the wobble period.

The 56-ary counter 42 constitutes a high-order counter that counts a count output of the 69-ary counter 41. The 56-ary counter 42 defines timing in one bit period. Initialization for loading a predetermined value according to a peak generated in a correct delimiter of fifty-six chips outputted from the operator 36 is performed. The 56-ary counter 42 generates various timing signals T2 in the bit period.

The 83-ary counter 43 constitutes a high-order counter that counts a count output of the 56-ary counter 42. The 83-ary counter 43 defines timing in one ADIP word period. When synchronization detection is performed, initialization for loading a predetermined value is performed. The 83-ary counter 43 generates various timing signals T3 in the one ADIP word period.

The ternary counter 44 constitutes a high-order counter that counts a count output of the 83-ary counter 43. The ternary counter 44 defines timing in one RUB period. Initialization for loading a predetermined value according to contents of ADIP data reproduced is performed. The ternary counter 44 generates various timing signals T4 in the one RUB period.

FIG. 10 is a schematic diagram for explaining synchronization detection for initializing the 83-ary counter 43. One ADIP word includes 83 bits. Necessary information is represented by using 60 bits among the 83 bits. In this case, as shown in FIG. 10, four data bits are placed between bits "0". On the other hand, bits "1" continue up to a bit 5 in the front portion in the word. Five bits "1" do not continue in other portions of the word. Thus the five continuing bits "1" are used for synchronization detection as a unique pattern. This method of synchronization detection is an example. It is possible to adopt other methods such as a method of detecting synchronization in the same manner as the detection of the bit data using other pseudo-random sequences.

Figure 11:
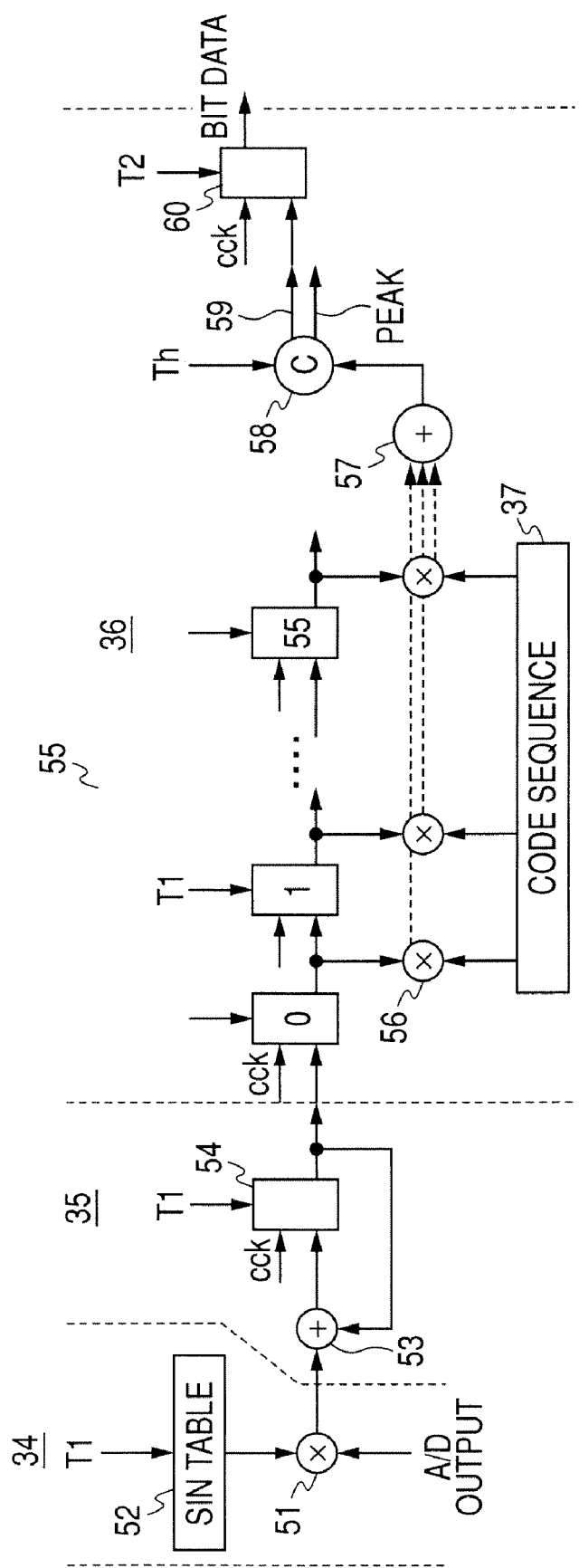
FIG. 11 is a block diagram showing a specific structure of a part of the reproducing apparatus according to the embodiment.

FIG. 11 is a block diagram specifically showing a structure of a part of the structure on the reproduction side shown in FIG. 7. A multiplier 51 multiplies a digital reproduced modulated wobble signal, which is converted into a digital signal by the A/D converter 31, by a sin signal ($\sin(2\pi 2ft)$) from a sin wave generation table 52. The multiplier 51 and the table 52 constitute the operator 34. A timing signal T1 in one wobble period is supplied to the table 52 from the 69-ary counter 41 of the timing generator (see FIG. 9).

The integrator 35 in one wobble period includes an adder 53 and a register 54. An output of the adder 53 is captured into the register 54 in synchronization with the clock signal cck. An output of the register 54 is fed back to the adder 53. An integral value in the one wobble period is outputted from the resister 54 and supplied to the operator 36 at the next stage by the timing signal T1.

The operator 36 includes a 56-bit shift register 55, a code sequence generator 37, and an arithmetic operation unit 56 that subjects a parallel output of the shift register 55 and a parallel output of the code sequence generator 37 to EXNOR. A value of each of chips captured into each of registers of the shift register 55 is sequentially shifted. On the other hand, a code sequence outputted from the code sequence generator 37 is predetermined data of the fifty-six chips. Moreover, an adding unit 57 that adds up fifty-six outputs of the arithmetic operation unit 56 is provided. An output (i.e., an integral value) of the adding unit 57 is supplied to a comparator 58 and compared with a threshold Th.

The comparator 58 has a structure of a window comparator. The comparator 58 generates a comparison output 59 by comparing thresholds on a positive side and a negative side and an integral value. The comparison output 59 is data indicating that one bit of data is "1" (+), "0" (−1), or "undefined" (?). A timing signal corresponding to a peak is outputted by the comparator 58 and, as described above, used for generation of timing by the timing generator.

The comparison output 59 is inputted to a register 60. The register 60 is supplied with a timing signal T2 outputted from the 56-ary counter 42 of the timing generator and outputs bit data at every bit timing.

Figure 12A:
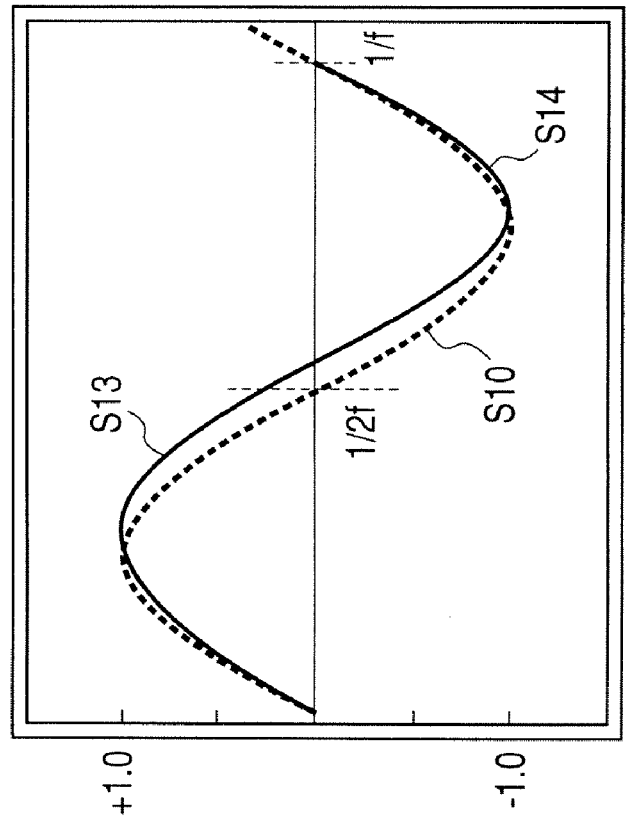
FIGS. 12A and 12B are waveform charts used for explanation of another modulation example of a modulated wobble signal.
Figure 12B:
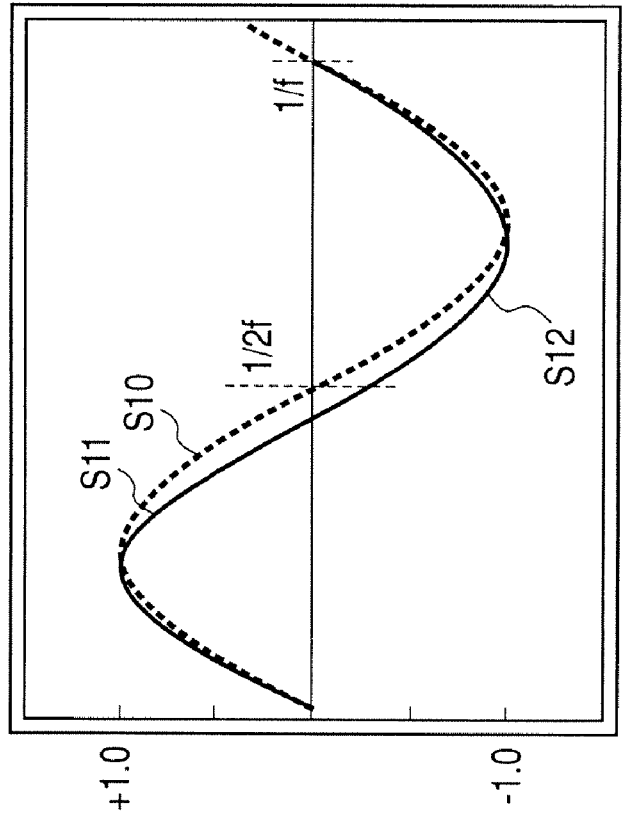
Figure 13:
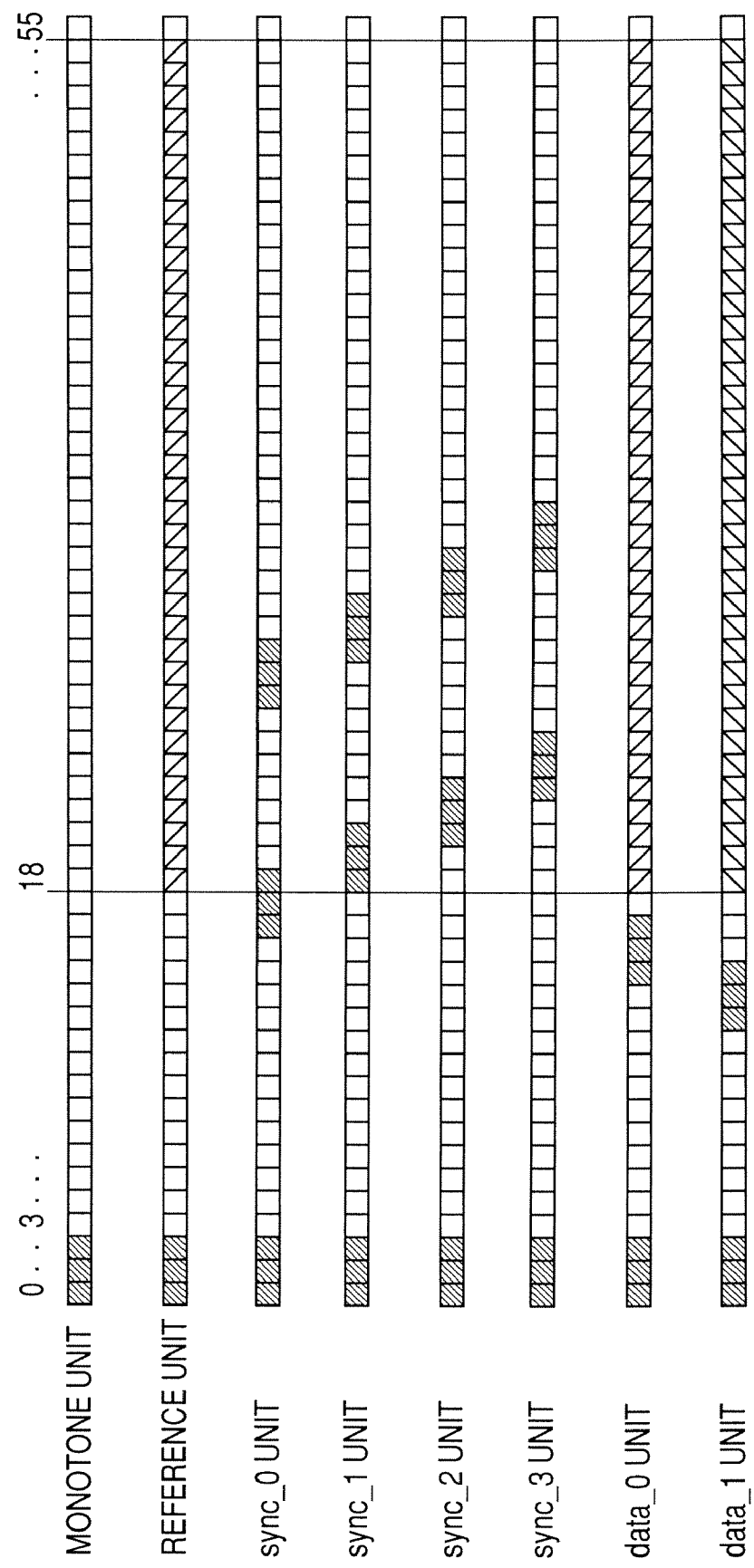
FIG. 13 is a schematic diagram used for explanation of an address format proposed in the past.

FIGS. 12A and 12B are waveform charts showing another modulation example of a micro-modulation method for each of wobbles of a wobble waveform. In the case of the chip c(n)=1, a sin waveform S10 serving as a basic wobble waveform is modulated as shown in FIG. 12A and as indicated by the following equations to form modulated waveforms S11 and S12.

$$S10 = A \sin \{2\pi ft\}$$

$$S11 = A \sin \{2\pi(f+d)t\}, \text{ where } 0 \leq t \leq 1/(2f)$$

$$S12 = A \sin \{2\pi((f-d)(t-1/(2f))+(f+d)(1/(2f)))\}, \text{ where } 1/(2f) < t \leq 1/f$$

In the case of the chip c(n)=0, the sin waveform S10 serving as the basic wobble waveform is modulated as shown in FIG. 12B and as indicated by the following equations to form modulated waveforms S13 and S14.

$$S13 = A \sin \{2\pi(f-d)t\}, \text{ where } 0 \leq t \leq 1/(2f)$$

$$S14 = A \sin \{2\pi((f+d)(t-1/(2f))+(f-d)(1/2f))\}, \text{ where } 1/(2f) < t \leq 1/f$$

The embodiment of the invention has been specifically explained. However, the invention is not limited to the embodiment described above. Various modifications based on the technical idea of the invention are possible. For example, the numerical values cited in the embodiment are merely examples. Numerical values different from these numerical values may be used when necessary. As the structure of the cutting apparatus, structures other than that shown in FIG. 1 are possible. Moreover, the recording medium is not limited to a disc shape and may be a card shape.

It should be understood by those skilled in the art that various modifications, combinations, sub-combinations, and alterations may occur depending on design requirements and other factors insofar as they are within the scope of the appended claims or the equivalents thereof.

What is claimed is:

1. A recording medium in which address information is recorded in advance, one bit of the address information recorded is represented by a modulated wobble signal obtained by modulating each of a predetermined number of modulation unit sections of a wobble waveform, and a groove is formed in association with the modulated wobble signal, wherein
   the modulated wobble signal is adapted such that, in converting the one bit of the address information into a chip sequence in which a predetermined number of chips continue, a code sequence is inverted when the one bit is a first value and is not inverted when the one bit is a second value,
   an arithmetic operation of the code sequence and the chip sequence is performed, and
   the modulated wobble signal is generated by modulating a wobble waveform in a modulation unit section according to a value of each of the chips of the chip sequence.

2. A recording medium according to claim 1, wherein
   the modulation unit section is one period of a sin wave or a cos wave, and
   a harmonic signal having a different polarity according to a value of the chip is added to the wobble waveform.

3. A recording medium according to claim 1, wherein
   the modulation unit section is one period of a sin wave or a cos wave, and
   the modulated wobble signal is subjected to FM modulation according to a value of the chip.

4. A recording medium according to claim 1, wherein the code sequence is a pseudo-random sequence.

5. A recording method of recording a modulated wobble signal obtained by modulating each of a predetermined number of modulation unit sections of a wobble waveform on the recording medium, the modulated wobble signal representing one bit of address information, wherein
   in converting the one bit of the address information into a chip sequence in which a predetermined number of chips continue, a code sequence is inverted when the one bit is a first value and is not inverted when the one bit is a second value,
   an arithmetic operation of the code sequence and the chip sequence is performed, and
   the modulated wobble signal is generated by modulating a wobble waveform in a modulation unit section according to a value of each of the chips of the chip sequence.

6. A recording method according to claim 5, wherein
   the modulation unit section is one period of a sin wave or a cos wave, and
   a harmonic signal having a different polarity according to a value of the chip is added to the wobble waveform.

7. A recording method according to claim 5, wherein
   the modulation unit section is one period of a sin wave or a cos wave, and
   the modulated wobble signal is subjected to FM modulation according to a value of the chip.

8. A recording method according to claim 5, wherein the code sequence is a pseudo-random sequence.

9. A recording apparatus that records a modulated wobble signal obtained by modulating each of a predetermined number of modulation unit sections of a wobble waveform on the recording medium, the modulated wobble signal representing one bit of address information, the recording apparatus comprising:
   arithmetic operation means for converting the one bit of the address information into a chip sequence, in which a predetermined number of chips continue, to invert a code sequence when the one bit is a first value and not to invert the code sequence when the one bit is a second value; and
   wobble-waveform generating means for generating the modulated wobble signal by modulating a wobble waveform in a modulation unit section according to a value of each of the chips of the chip sequence, wherein the arithmetic operation means performs an arithmetic operation on the code sequence and the chip sequence.

10. A reproducing method of converting one bit of address information into a chip sequence, in which a predetermined number of chips continue, to invert a code sequence when the one bit of the address information is a first value and not to invert the code sequence when the one bit of the address information is a second value, modulating a wobble waveform in a modulation unit section according to a value of each of the chips of the chip sequence, and reproducing a recording medium in which the one bit of the address information is recorded in a predetermined number of modulation unit sections of a modulated wobble signal, the reproducing method comprising the steps of:

reproducing the modulated wobble signal from the recording medium;

generating the chip sequence from the modulated wobble signal reproduced;

subjecting the chip sequence and the code sequence to an arithmetic operation and discriminating delimiters of the predetermined number of modulation unit sections representing the one bit of the address information from the one bit of the address information on the basis of a result of the arithmetic operation; and initializing timing generation according to the delimiters of the modulation unit sections.

11. A reproducing apparatus that converts one bit of address information into a chip sequence, in which a predetermined number of chips continue, to invert a code sequence when the one bit of the address information is a first value and not to invert the code sequence when the one bit of the address information is a second value, modulates a wobble waveform in a modulation unit section according to a value of each of the chips of the chip sequence, and reproduces a recording medium in which the one bit of the address information is recorded in a predetermined number of modulation unit sections of a modulated wobble signal, the reproducing apparatus comprising:

reproducing means for reproducing the modulated wobble signal from the recording medium chip-sequence generating means for generating the chip sequence from the modulated wobble signal reproduced;

arithmetic operation means for subjecting the chip sequence and the code sequence to an arithmetic operation and discriminating delimiters of the predetermined number of modulation unit sections representing the one bit of the address information from the one bit of the address information on the basis of a result of the arithmetic operation; and timing generating means initialized according to the delimiters of the modulation unit sections.

12. A recording apparatus that records a modulated wobble signal obtained by modulating each of a predetermined number of modulation unit sections of a wobble waveform on the recording medium, the modulated wobble signal representing one bit of address information, the recording apparatus comprising:

an arithmetic operation unit converting the one bit of the address information into a chip sequence, in which a predetermined number of chips continue, to invert a code sequence when the one bit is a first value and not to invert the code sequence when the one bit is a second value; and a wobble-waveform generating unit generating the modulated wobble signal by modulating a wobble waveform in a modulation unit section according to a value of each of the chips of the chip sequence, wherein the arithmetic operation unit performs an arithmetic operation on the code sequence and the chip sequence.

13. A reproducing apparatus that converts one bit of address information into a chip sequence, in which a predetermined number of chips continue, to invert a code sequence when the one bit of the address information is a first value and not to invert the code sequence when the one bit of the address information is a second value, modulates a wobble waveform in a modulation unit section according to a value of each of the chips of the chip sequence, and reproduces a recording medium in which the one bit of the address information is recorded in a predetermined number of modulation unit sections of a modulated wobble signal, the reproducing apparatus comprising:

a reproducing unit reproducing the modulated wobble signal from the recording medium;

a chip-sequence generating unit generating the chip sequence from the modulated wobble signal reproduced;

an arithmetic operation unit subjecting the chip sequence and the code sequence to an arithmetic operation and discriminating delimiters of the predetermined number of modulation unit sections representing the one bit of the address information from the one bit of the address information on the basis of a result of the arithmetic operation; and a timing generating unit initialized according to the delimiters of the modulation unit sections.

14. The recording medium of claim 1, wherein the arithmetic operation includes initializing timing signal generation based on delimiters of the modulation unit section.

15. The recording method of claim 5 further comprising initiating timing signal generation based on delimiters of the modulation unit section.

16. The recording apparatus of claim 9, wherein the arithmetic operating means includes means for initializing timing signal generation based on delimiters of the modulation unit section.

* * * * *